May 31, 1949.        S. C. YOUNG        2,471,599
APPARATUS FOR CONNECTING AND DISCONNECTING
HEAVIER-THAN-AIR AIRCRAFT WHILE IN FLIGHT
Filed April 20, 1946        3 Sheets-Sheet 1
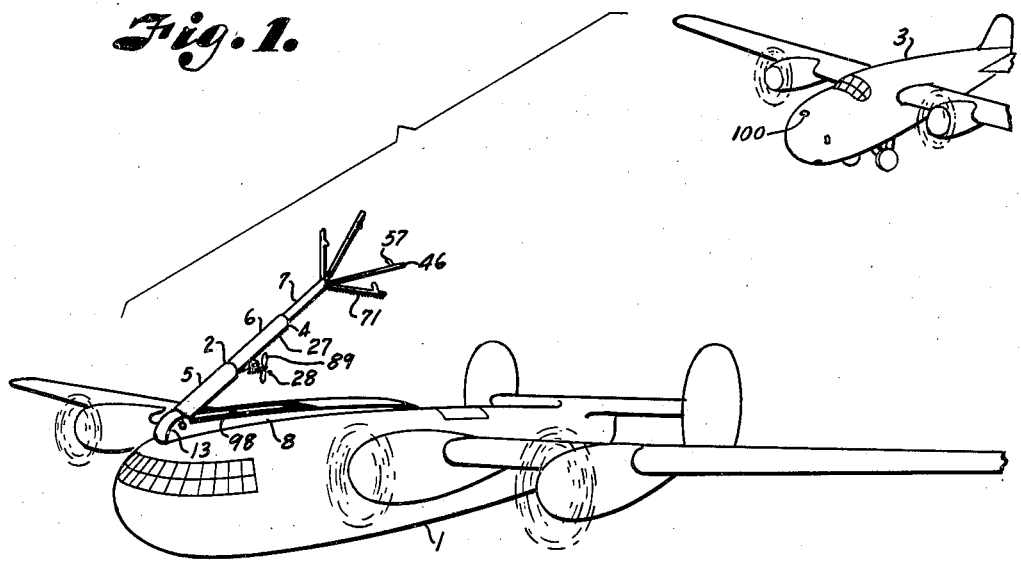
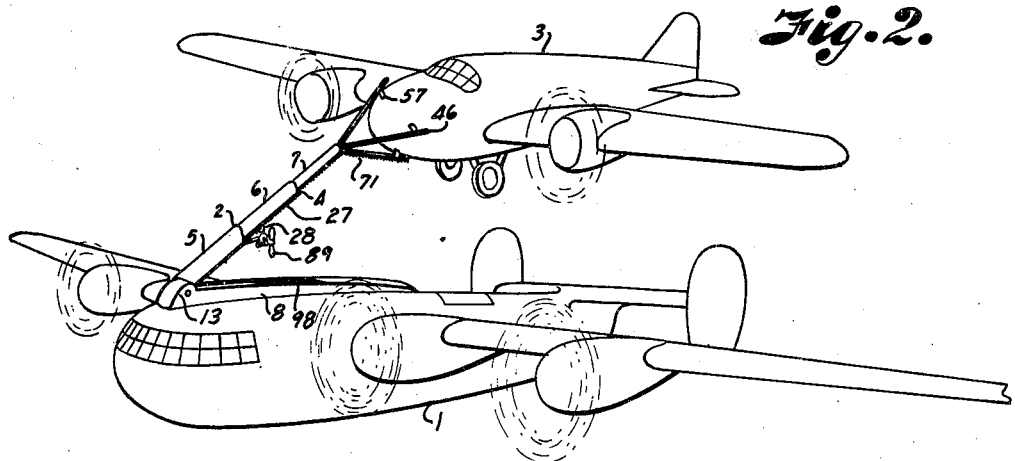
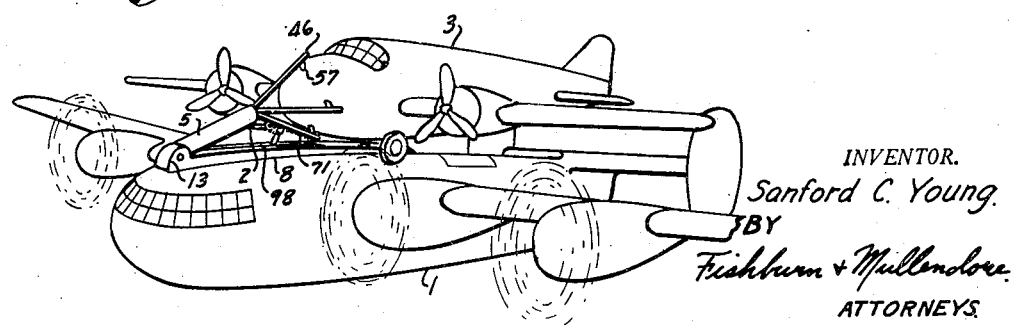
INVENTOR.
Sanford C. Young.
BY
Fishburn + Mullendore.
ATTORNEYS.

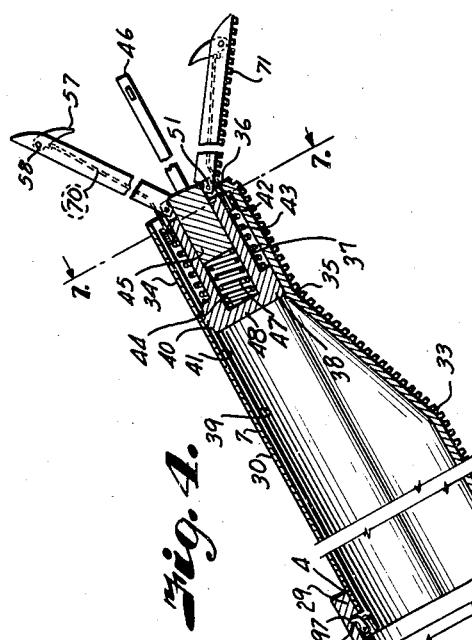

May 31, 1949.    S. C. YOUNG    2,471,599
APPARATUS FOR CONNECTING AND DISCONNECTING
HEAVIER-THAN-AIR AIRCRAFT WHILE IN FLIGHT
Filed April 20, 1946    3 Sheets-Sheet 3
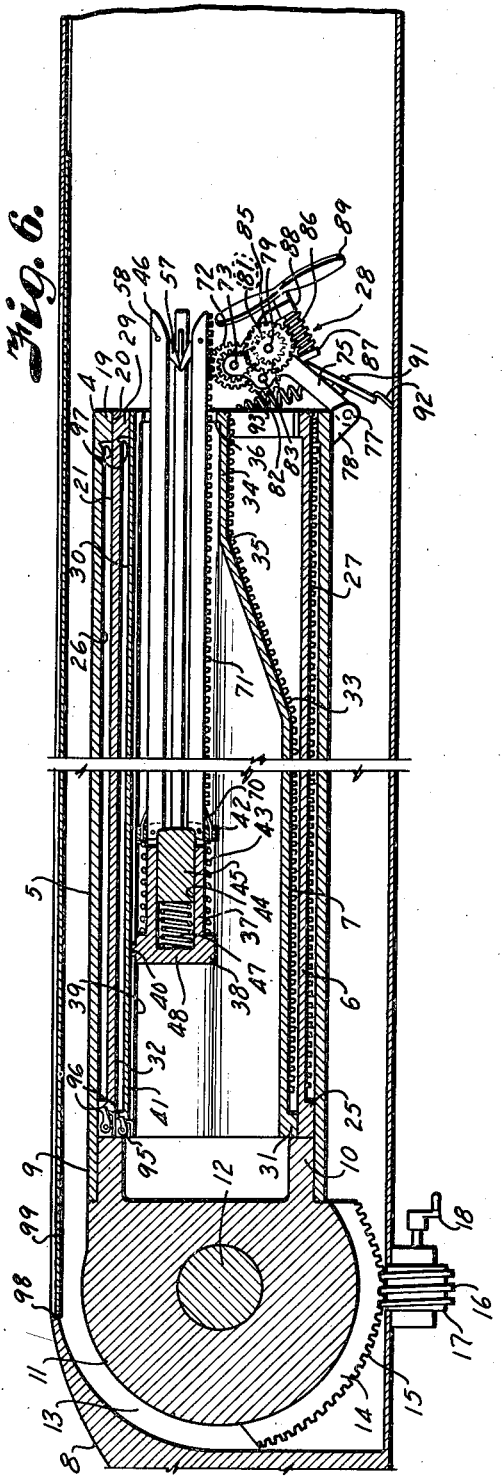
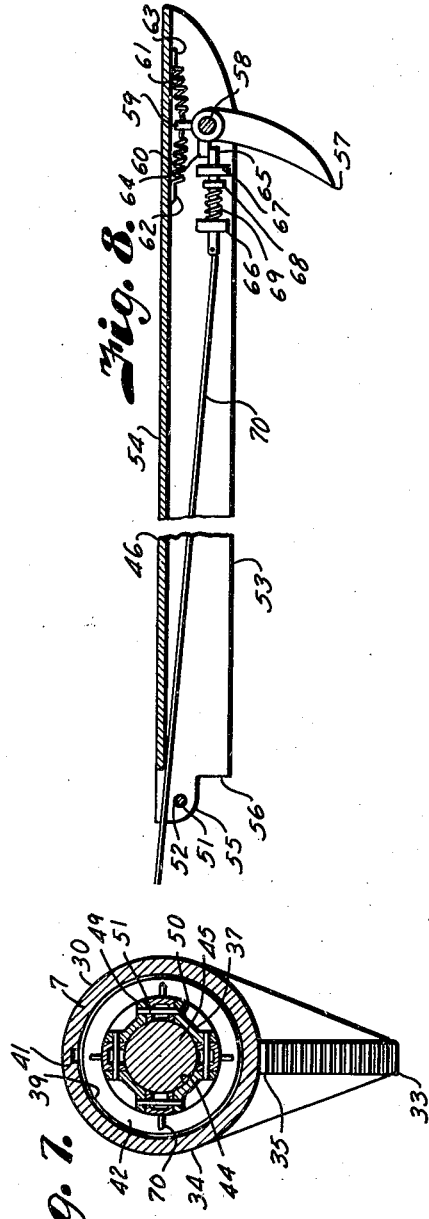
INVENTOR.
Sanford C. Young.
BY
Fishburn + Mullenclore
ATTORNEYS Patented May 31, 1949

2,471,599

UNITED STATES PATENT OFFICE 2,471,599

APPARATUS FOR CONNECTING AND DISCONNECTING HEAVIER-THAN-AIR AIRCRAFT WHILE IN FLIGHT

Sanford C. Young, French Creek, W. Va.

Application April 20, 1946, Serial No. 663,734

11 Claims. (Cl. 244—2)

1

This invention relates to apparatus for connecting and disconnecting heavier than air aircraft while in flight, and more particularly to apparatus to enable two airplanes to come together in pickaback relation, first by a preliminary connection, to guide and stabilize the action of the airplanes in moving into and out of a final contact position in such a manner that doors or apertures may register so that persons may pass and things may be passed from one airplane to the other while in flight.

The principal objects of the invention are to provide apparatus for attaching and detaching airplanes in flight whereby an airplane may continue in flight indefinitely, and transfer and/or exchange passengers, crews, mail, express, freight, etc. and be supplied with fuel, ammunition, missiles, medical supplies, scientific instruments, etc., so that a commercial airplane may discharge and/or take aboard passengers, crews, and/or things without landing, by being serviced by an airplane from wayside stations, and so that military airplanes may fly to any point on earth and return without landing, and be enabled to repeatedly reach combat zones or mission points by shuttling from nearby airplanes in flight, as a supply base, thus reducing the necessary load, and the risk of personnel and equipment, and vastly increasing the maneuverability of the airplane, and so that scientific research airplanes may remain aloft indefinitely, and when no longer capable of flight may transfer personnel and equipment to another airplane to continue aloft, even to the extreme of acclimating personnel to greater altitudes; and possibly, though as fantastic as it may now seem, to enable personnel to be born aloft, generation after generation, coming to earth only after their scientific usefulness is past; to provide attaching means for connecting two airplanes pickaback in flight; to provide attaching means so as to guide and cushion the movement of two airplanes when moving from preliminary contact positions to transferring contact position and vice versa; to provide a strong and positive connection capable of holding two airplanes together for making landings while attached, and for assisting heavily loaded airplanes to take off and/or gain altitude such as to pass over mountain ranges; to provide airplane attaching means which may be folded into the fuselage of a plane while in normal flight; to provide for extending attaching means from the plane whereby another plane may make contact with said means; to provide attaching means which is retracted to guide the

2 contacting plane into engagement with a transport plane by differential in the speed of the respective planes; to provide means for automatically releasing contacting planes when said planes reach a predetermined spacing during detaching operation; to provide a telescoping attaching means for connecting the planes; and to provide means for selectively extending and retracting the telescoped connecting means.

In accomplishing these and other objects of the invention, I have provided improved details of structure, the preferred forms of which are illustrated in the accompanying drawings wherein:

Fig. 1 is a perspective view of a plane having a connecting means embodying the present invention shown in operative position preparatory to connection by a contacting plane.

Fig. 2 is a perspective view of a transport plane and contacting plane illustrating the positions thereof for effecting preliminary contact.

Fig. 3 is a perspective view of a transport and contacting plane subsequent to the effecting of attachment.

Fig. 4 is a longitudinal sectional view through the telescopic connecting member in raised and extended position.

Fig. 5 is a transverse sectional view through the telescopic attaching member particularly showing the mechanism for extending and retracting respective portions of said connecting member.

Fig. 6 is a longitudinal sectional view through the attaching member in retracted and folded condition as in normal flight.

Fig. 7 is a transverse sectional view through the attaching member on a line 7—7, Fig. 4.

Fig. 8 is a longitudinal sectional view through one of the attaching fingers particularly showing the structure of the latch for engagement with a contacting plane.

Referring more in detail to the drawings:

I designates a liner or transport aircraft on which is mounted mechanism 2 for connecting a contacting plane 3 adapted for carrying mail, fuel, passengers or other things desirable to transfer to or from the transport plane 1. The attaching apparatus 2 preferably consists of an arm 4 formed of telescoping sections 5, 6 and 7, it being obvious that any number of sections may be used to provide a suitable length for the arm when extended and which may be shortened sufficiently when retracted to pass into a housing 8 preferably forming a part of the fuselage and positioned on a forward portion at the top thereof. The largest section and base member 5 of the telescoping arm 4 is preferably tubular and arranged with the lower end 9 thereof sleeved over a projection 10 of a bearing member 11 which is rotatably mounted on a shaft 12 suitably supported in the forward end 13 of the housing 8. The bearing member 11 is provided with suitable means for rotating the bearing member on the shaft 12 to raise the arm 4 out of the housing 8. Such mechanism may consist of a gear segment 14 on the bearing member 11 having teeth 15 meshing with teeth 16 of a worm gear 17 operated by suitable means, such as a crank 18.

The forward end of the section 5 is provided with an inwardly extending flange 19 having a bore 20 adapted to engage the outer surface 21 of the intermediate arm section 6. The section 6 is tubular of substantially the same cross sectional shape as the section 5, said section 6 having an arcuate upper surface 22 terminating in downwardly converging walls 23 and 24. As illustrated in Fig. 5, the sections of the arm member are streamlined, the transverse section thereof being substantially an inverted teardrop in shape. The rearward portion of the section 6 is provided with an outwardly extending flange 25 engaging the inside surface 26 of the arm section 5. With this arrangement the engagement of the flanges 19 and 25 with the respective walls provide spaced bearing contact to support the arm section and also form stops to limit the extension of the respective arm members. The lower edge of the arm section 6 is provided with gear teeth 27 for engagement with an extending and retracting mechanism 28 as later described.

The forward end of the arm section 6 is provided with an inwardly extending flange 29 engaging the outer surface 30 of the arm section 7. The rear portion of the arm section 7 is substantially the same shape as the section 6 and is provided with a flange 31 engaging the inside surface 32 of the section 6 to provide bearing and movement limitation in the same manner as the flanges 19 and 20. The lower edge of the arm section 7 is provided with gear teeth 33 and toward the forward end of said arm member the lower edge tapers upwardly and outwardly to connect with a substantially cylindrical portion 34 at the forward end of said arm member as at 35. The forward end of the section 7 is provided with an inwardly extending flange 36 forming a stop to limit outward travel of a cylinder member 37 which has a flange 38 on the rear end thereof, said flange having sliding engagement with the inside surface 39 of the section 7. The flange 38 is provided with an outwardly extending boss 40 having engagement in a groove 41 in the upper portion of the arm section 7 to prevent relative rotation of the cylinder and the arm section. The cylinder 37 is substantially of the same diameter as the bore of the flange 36, the forward end of said cylinder being adapted to receive a collar 42 slidable thereon, a spring 43 preferably being provided on the cylinder and having the ends thereof engaging the flange 38 and the collar 42 respectively. The cylinder is provided with a bore 44 adapted to receive a piston 45 slidable therein adapted to engage fingers 46 as later described. A spring 47 is interposed between the piston 45 and the rear wall 48 of the cylinder to force the piston outwardly therein. The forward end of the cylinder is provided with spaced ears 49 as illustrated in Fig. 7, said ears having apertures 50 adapted to receive a pin 51 extending through aligned apertures 52 in the fingers 46 to pivotally mount said fingers on said cylinder. In the illustrated instance four fingers are shown; however, it is obvious that any suitable number of fingers can be provided.

The fingers preferably consist of channel-shaped members having inwardly extending flanges 53 connected by a web portion 54, the flanges being provided with rearwardly extending bosses 55 of less width than the flanges 53 to provide a shoulder 56 adapted to engage the end of the piston 45 whereby the spring 47 engages said piston and forces same outwardly to spread the fingers as illustrated in Fig. 4. The forward ends of the fingers 46 are provided with hooks 57 pivotally mounted on pins 58 secured in the flanges 53 of said fingers. The hooks 57 extend inwardly relatively to the fingers and are provided with outwardly extending bosses 59 to which are connected springs 60 and 61, the other ends of the springs being connected to the web portion of the fingers as at 62 and 63 respectively, whereby tension of the springs tends to hold the hooks 57 in inwardly extending position. The hooks are provided with rearwardly extending ears 64 adapted to be engaged by a latch 65 slidable in spaced bearings 66 and 67, said latch having a flange 68 adapted to be engaged by one end of a spring 69 sleeved on the latch, with the other end in engagement with the bearing member 66 whereby said spring tends to force the latch outwardly into engagement with the ear 65. The rear end of the latch member is attached to a line 70, the other end of which is connected to the collar 42. One of the fingers is preferably in line with the lower edge of the attaching arm and is provided with gear teeth 71 for engagement with the extending and retracting mechanism 28 now to be described.

Meshing with the respective gear teeth on the arm sections is a pinion 72 mounted on a shaft 73 having the ends thereof rotatably mounted in apertures 74 of arms 75 and 76 as illustrated in Fig. 5, said arms being pivotally mounted as at 77 in bosses 78 at the outer end of arm section 5. Spaced from the shaft 73 is a splined shaft 79 having the ends thereof pivotally mounted in the arms 75 and 76 as at 80 and slidable on the splined shaft 79 in a pinion gear 81 having selective engagement with a pinion 72 and a gear 82 on a stub shaft 83, said gear 82 meshing with a gear 84 on the shaft 73. The outer end of the splined shaft 79 is provided with a worm gear 85 meshing with a worm 86 rotatably mounted in bearings 87 and 88 on the arm member 75, the end of the worm being provided with a propeller blade 89 adapted to rotate in the path of the slipstream passing by the attaching arm. Slidable gear 81 is moved on the splined shaft by means of a yoke 90 pivoted to the arm 75 as at 91, suitable operating connection 92 being connected with the yoke 90 whereby someone in the plane 1 may operate said yoke to control the extending and retracting operations of the attaching member.

The extending and retracting mechanism 28 is held in engagement with the members of the attaching arm by means of a spring 93 having one end attached to the arm 76 and the other end secured approximately midway of the height of the section 5 as at 94.

In order to hold the respective members of the attaching arm in extending relation, latches 95 are provided in the flanges 25 and 31 of the sections 6 and 7, said latches having detents 96 engageable in the bores of the respective sections 5 and 6, said latches and grooves being positioned so the latches will be engaged in the grooves when the flanges 25 and 31 engage the flanges 19 and 29 respectively. In normal flying the attaching arm is retracted and lowered into the housing 8 as shown in Fig. 6, said housing being provided with an opening 98 normally covered by a closure member 99 substantially conforming to the curvature of the housing to reduce any drag on the plane.

The operation of a device constructed as described is as follows:

The transport plane 1 in normal flight will have the attaching member in the housing 8 and the cover member in closed position. When the occasion arises and it is necessary to make contact with the transport for transferring passengers, crew, fuel or other items, the contacting plane maneuvers to a preliminary contact position, preferably to the rear and slightly above the transport plane. The cover member is then moved to open the housing 8 and the elevating mechanism operated as by turning the crank 18 to pivot the contacting arm on the shaft 12 to raise said arm out of the housing, the arm being in retracted position. The yoke 90 is then operated to move the gear into engagement with the pinion 72 which is engaged with teeth 71 on the end of the lower finger 46, the position being substantially the same as shown in Fig. 6. The slipstream passing by the arm rotates the propeller 89, turning the gears to move the fingers outwardly in the arm section 7. The fingers being attached to the cylinder 37 will also effect movement of said cylinder towards the end of the section 7. As the fingers reach the end of their travel, the piston 45 having engagement with the shoulders 56 will expand the fingers outwardly into a position substantially as shown in Fig. 4 for contacting the nose of the contacting plane. When the fingers reach the proper position the gear 72 will engage the teeth 33 on the section 7 to move said member outwardly relative to the section 6 of the arm 4, the section 7 being moved outwardly until the flange 31 engages the flange 29, at which time the latch 95 will engage in the groove 97 to hold said arm sections 6 and 7 in extended position. The gear 72 will then engage the teeth 27 on the section 6 to extend said section relative to the section 5 to complete the extension of the arm member, the latch 95 engaging in the groove 97 of the arm section 5 to hold the section 6 in extended position. The yoke 90 may then be operated to move the gear 81 into a neutral position and the arm is ready for engagement with the contacting plane.

The contacting plane approaches the liner or transport plane 1 particularly as shown in Fig. 1, the nose of the fuselage of said contacting plane is maneuvered into engagement with the fingers 46, the hooks 57 engaging in slots 100 in the nose of the contacting plane. The contacting plane, maneuvering into said position, should have slightly faster speed than the transport plane 1 and continued differential in speed will cause the contacting plane to force the respective arm sections into retracted position, the arm sections guiding the contacting plane downwardly onto the liner plane until they are arranged in pickaback relation as shown in Fig. 3, at which time the planes may be anchored together by any suitable means. This action will be preferable to high altitude and at cruising or coasting speed.

After transfer of the load from the contacting plane to the transport plane the motors on the contacting plane may be started or the speed thereof increased to a speed which would normally support the contacting plane in flight. The devices securing the planes together are then released and the contacting plane motors slowed until there is a differential in speed between the planes, the liner having a slightly higher speed causing it to move forwardly relative to the contacting plane which will pull the respective arm sections outwardly into extended position. When the arm members reach the full extent of their movement, further rearward pull on the contacting plane will pull the cylinder 37 toward the end of the arm tending to compress the spring 47 as the ring 42 is engaged with the flange 36. Relative movement of the cylinder 37 will cause relative motion between the ring 42 and the fingers 46 to apply tension on the connecting line 70 to retract the latching member 65 from engagement with the ear 64 to release the hooks 57 for movement. The rearward force applied by the contacting plane to the hooks 57 then moves same outwardly to release the contacting plane whereby it may go on to a landing field or other suitable destination. Release of the hooks from the contacting plane will cause the hooks to come back into normal position by means of the springs 60 and 61 which are balanced. Also release of the contacting plane will permit the spring 43 to force the cylinder 37 downwardly in the arm section 7 to release the latch member 65 for engagement with the ear 64 on the hook 57. The yoke 90 is then moved to effect engagement of the gear 81 with the gear 82 whereby rotation of the propeller 89 will retract the arm section 6, then the arm section 7, and finally the fingers 46 into the arm. When retraction of the arm is complete, the crank 18 is operated to rotate the gear 17 to move the arm member downwardly into the housing and the cover member 99 closed to return the transport plane into condition for normal flight whereby it may continue on to another destination or other point of contact with a similar plane to load or remove items and personnel from the transport plane.

It is believed obvious that with this arrangement the liner plane may continue in flight and be refueled, receive passengers, freight and the like, or have same removed as desired.

What I claim and desire to secure by Letters Patent is:

1. In a device of the character described, an airplane, a telescopic arm pivotally mounted on said airplane at the forward end thereof, means for pivoting the telescopic arm to move the rearward portion thereof upwardly relative to said airplane, means for extending said telescopic arm members, means on the telescopic arm adapted to engage a contacting plane whereby differential speed of the respective planes will cause retraction of the telescopic member whereby the planes are moved into pickaback relation, and means responsive to differential of the speed of the planes for automatically releasing the contacting plane from engagement with said fingers.

2. In a device of the character described, an airplane, a telescopic arm pivotally mounted in said housing at the forward end thereof, means for pivoting the telescopic arm to move the rearward portion thereof upwardly relative to the airplane, means responsive to the slipstream passing said arm for extending said telescopic arm members, means on said telescopic arm adapted to engage a contacting plane whereby differential speed of the respective planes will cause retraction of the telescopic member whereby the planes are moved into pickaback relation, and means responsive to differential of the speed of the planes for automatically releasing the contacting plane from engagement with said fingers.

3. In a device of the character described, an airplane having a housing on the upper portion thereof, a telescopic arm pivotally mounted in said housing at the forward end thereof, means for pivoting the telescopic arm to move the rearward portion thereof out of the housing, means responsive to the slipstream passing said arm for extending said telescopic arm members, fingers on the end of the telescopic member, means on said fingers adapted to engage a contacting plane whereby differential speed of the respective planes will cause retraction of the telescopic member whereby the planes are moved into pickaback relation, and means responsive to differential of the speed of the planes for automatically releasing the contacting plane from engagement with said fingers.

4. In a device of the character described, an airplane, a telescopic arm pivotally mounted on the upper portion of said airplane, fingers mounted at the outer end of said telescopic arm, means slidable in said arm having engagement with said fingers to extend same, hook members on said fingers adapted to engage a contacting plane, and means for releasing the hook members in response to outward pressure on said fingers.

5. In a device of the character described, an airplane, a telescopic arm pivotally mounted on the upper portion of said airplane, fingers mounted at the outer end of said telescopic arm, hook members on said fingers adapted to engage a contacting plane, latch members on the fingers for holding the hook members in engaged position, and means for operating said latch members to release the hooks in response to outward pressure on said fingers.

6. In a device of the character described, an airplane, a telescopic arm pivotally mounted on the upper portion of said airplane, fingers mounted at the outer end of said telescopic arm, means slidable in said arm having engagement with said fingers to extend same, hook members on said fingers adapted to engage a contacting plane, latch members on the fingers for holding the hook members in engaged position, and means for operating said latch members to release the hooks in response to outward pressure on said fingers.

7. In a device of the character described, an airplane, a housing on the upper forward portion of the airplane, a telescopic arm pivotally mounted in said housing, means for moving the rearward portion of said arm upwardly relative to said airplane, means for extending the respective members of the telescopic arm, means on the end of the arm for engaging a contacting plane, and means for automatically releasing said contacting plane from engagement with the engaging means.

8. In a device of the character described, an airplane, a housing on the upper forward portion of the airplane, a telescopic arm pivotally mounted in said housing, means for moving the rearward portion of said arm upwardly relative to said airplane, means for extending the respective members of the telescopic arm, fingers mounted at the outer end of the telescopic arm engageable with a contacting plane, means in said arm having engagement with the fingers to extend same, and means for automatically releasing said contacting plane from engagement with the fingers.

9. In a device of the character described, an airplane, a housing on the upper forward portion of the airplane, a telescopic arm pivotally mounted in said housing, means for moving the rearward portion of said arm upwardly relative to said airplane, means responsive to the slip stream passing said arm for extending the respective members of the telescopic arm, fingers mounted at the outer end of the telescopic arm, means slidable in the arm having engagement with the fingers for extending same, hook members on said fingers adapted to engage a contacting plane, latch members on the fingers for holding the hook members in engaged position, and means for operating said latch members to release the hooks in response to outward pressure on said fingers.

10. In a device of the character described, an airplane, a housing on the upper forward portion of the airplane, a telescopic arm pivotally mounted in said housing, means for moving the rearward portion of said arm upwardly relative to said airplane, means responsive to the slip stream passing said arm for extending the respective members of the telescopic arm, fingers mounted at the outer end of the telescopic arm, means slidable in the arm having engagement with the fingers for extending same, hook members on said fingers adapted to engage a contacting plane, latch members on the fingers for holding the hook members in engaged position, means for operating said latch members to release the hooks in response to outward pressure on said fingers, and means operable to effect retraction of the telescoping arm and fingers, and means for closing the housing.

11. In a device of the character described, an airplane, an arm mounted on said airplane, fingers mounted at the outer end of the arm, means in the arm having engagement with the fingers for extending same, hook members on said fingers adapted to engage a contacting plane, latch means for holding the hook members in engaged position, and means for operating said latch means for releasing the hooks in response to outward pressure on said fingers.

SANFORD C. YOUNG.

REFERENCES CITED

The following references are of record in the file of this patent:

UNITED STATES PATENTS

| Number | Name | Date |
|---|---|---|
| 1,418,008 | Martin | May 30, 1922 |
| 1,627,185 | Krammer | May 3, 1927 |
| 1,748,663 | Tucker | Feb. 25, 1930 |
| 1,912,722 | Perkins | June 6, 1933 |
| 1,926,968 | Causan | Sept. 12, 1933 |

FOREIGN PATENTS

| Number | Country | Date |
|---|---|---|
| 484,657 | Great Britain | May 9, 1938 |